United States Patent
Bartelme

(10) Patent No.: US 6,744,746 B1
(45) Date of Patent: Jun. 1, 2004

(54) SYSTEM AND METHOD FOR COMMUNICATING ADDITIONAL DATA IN A DATA COMMUNICATIONS SYSTEM

(75) Inventor: Joseph P. Bartelme, Grapevine, TX (US)

(73) Assignee: Cyntrust Communications, Inc., Dallas, TX (US)

( * ) Notice: Subject to any disclaimer, the term of this patent is extended or adjusted under 35 U.S.C. 154(b) by 815 days.

(21) Appl. No.: 09/629,595

(22) Filed: Jul. 31, 2000

(51) Int. Cl.$^7$ ................................................ H04Q 7/00
(52) U.S. Cl. .................... 370/329; 370/330; 370/336; 455/450
(58) Field of Search ................... 370/328, 329, 370/330, 315, 327, 345, 347, 349, 350, 310, 236, 240, 255, 280, 293, 322, 341, 348, 389, 392, 394, 437, 461; 455/418; 709/215, 226, 250; 375/295, 222; 379/237

(56) References Cited

U.S. PATENT DOCUMENTS

| | | | | |
|---|---|---|---|---|
| 5,245,610 A | * | 9/1993 | Lindell | 370/329 |
| 5,465,269 A | * | 11/1995 | Schaffner et al. | 375/144 |
| 5,818,829 A | * | 10/1998 | Raith et al. | 370/347 |
| 6,275,480 B1 | * | 8/2001 | Schreier | 370/321 |
| 6,359,877 B1 | * | 3/2002 | Rathonyi et al. | 370/349 |
| 6,400,699 B1 | * | 6/2002 | Airy et al. | 370/329 |
| 6,519,280 B1 | * | 2/2003 | Cole | 375/222 |
| 6,567,387 B1 | * | 5/2003 | Dulin et al. | 370/329 |
| 6,567,397 B1 | * | 5/2003 | Campana et al. | 370/349 |
| 6,597,683 B1 | * | 7/2003 | Gehring et al. | 370/348 |
| 6,621,804 B1 | * | 9/2003 | Holtzman et al. | 370/329 |

* cited by examiner

*Primary Examiner*—Kenneth Vanderpuye
*Assistant Examiner*—Anthony T Ton
(74) *Attorney, Agent, or Firm*—Daniel R. Brown

(57) ABSTRACT

A system and method of communicating additional data in a data communications system are disclosed. Selective application of a plurality of algorithms is advantageously applied to encoded data to yield a dual benefit of satisfying a primary function as well as communicating additional data. In the preferred embodiment, a plurality of error detecting algorithms are linked to a plurality of additional data so that the system can identify the type of data slot packet that is presently decoded without the need for additional data bits to make such determination.

80 Claims, 7 Drawing Sheets

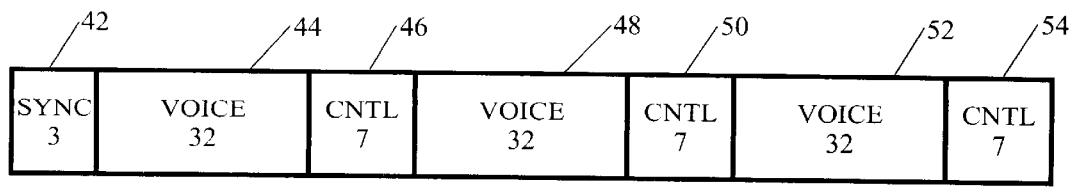
Fig. 6           40
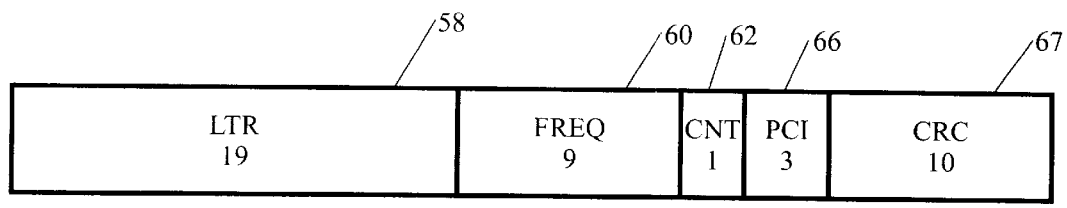
Fig. 7           56
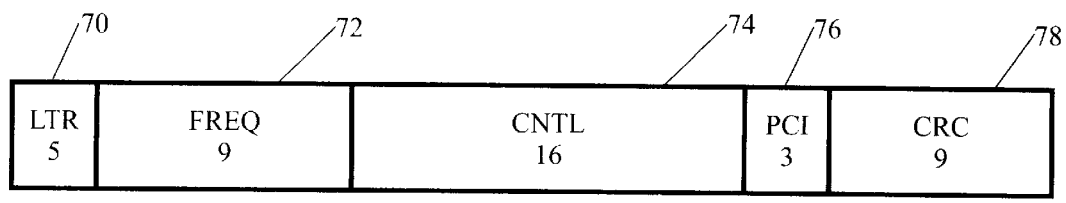
Fig. 8           68

SYSTEM AND METHOD FOR COMMUNICATING ADDITIONAL DATA IN A DATA COMMUNICATIONS SYSTEM

BACKGROUND OF THE INVENTION

1. Field of the Invention

The present invention relates to data communications. More specifically, the present invention relates communicating additional data through the use of algorithms sequentially applied to identify additional data as well as providing a primary function in the data communications protocol.

2. Description of the Related Art

Data communication systems are prevalent in a broad array of applications today. Data communications are carried over a broad variety of media, that include metallic circuits such as telephony twisted pair applications, coaxial cable applications, and other public and private wireline network environments. Data communications are employed extensively in fiber optic networks, and via infrared light pulse codes for propagation in space. Certainly most major radio based communications systems employ a data communications aspect for command and control, if not for actual voice communications. And, voice communications are increasingly being carried as data in modern communication system. In addition to voice applications, video and satellite application commonly use data communications. Even acoustic applications exists for data communications.

The dimensions of data communications are as varied as the media which carry data. Data networks that interconnect the entire world are now in operation. In fact, data communications extend beyond the bounds of Earth in the space program. Data communication systems exist regionally as well as locally in the forms or regional telephony services, radio communications systems, ATM networks, and other applications. Data communications systems may be as localized as a single office or home environment. In some applications, data communications systems exist only within a single computerized device, even sometimes as localized as a single integrated circuit.

Data communication systems are complex and require vast financial and engineering resources to create. Once deployed, they tend to have a great deal of inertia. This is particularly true in a distributed system where infrastructure is deployed over large areas and where multiple participants invest in the system. It is also true where a standard is established, whether by rule or de facto. As a network or standard grows and is accepted, it can become an entity in itself. Making the implementation of alterations to the protocol very difficult.

Another fundamental in data communications is that the market has an ever increasing demand for system performance. Higher data rates and increased features are always desirable. This is clearly the case in public networks, such as the Internet, but is also true in most other data communications application. In the area of land mobile radio, the trend over the years as been from single radio site systems with a crude data communications control aspect to broad area networks that provided advanced channel management, voice and data service tightly integrated to simplify development of user applications.

The tension then is to increase system performance in an environment where inertia limits the rate at which networks and protocols may evolve. In essence, when added capacity and features are required, added data throughput is needed to deliver them. However, added data throughput can be extremely difficult to deliver where an existing protocol dictates design criteria such as baud rates, packet sizes, and bandwidths.

Thus there is a need in the art for a system and method to increase data throughput in a data communications without altering the fundamentals of the data communications system.

SUMMARY OF THE INVENTION

The need in the art is addressed by the systems and methods of the present invention. A data communication system for communicating additional data is disclosed. The system generally includes a data transmitter and a data receiver.

The data transmitter portion of the system includes an encoder with an input for receiving a data packet, and which is operable to form a data slot packet by inserting the data packet and a bit pattern into the data slot. A memory stores several algorithms corresponding to several pieces of additional data. A controller is coupled to the memory and is operable to recall at least one of the algorithms in accordance with a specified piece of additional data. The controller is coupled to the encoder and calculates the bit pattern, in accordance with the data packet and the recalled algorithm, and inserts it into the data slot packet by use of the encoder. A transmitter is coupled to the encoder and transmits the data slot packet through a communications medium, which may be various types.

Respecting the data receiver portion of the system, which is connected to the opposite end of the communications medium, a receiver receives the data slot packet. A decoder is coupled to the receiver and operates to extract the data packet and the bit pattern. A second memory has the same algorithms and additional data stored within it. A second controller, coupled to the decoder, is operable to receive the extracted data packet and the extracted bit pattern. The second controller is also coupled to the second memory and operates to sequentially recall the plurality of algorithms and to calculate a verifying bit pattern in accordance with the extracted data packet. When the second controller finds equality between the verifying bit pattern and the extracted bit pattern, it assigns the presently selected additional data to the received data packet.

In further refinement of this invention, the data slot packet may be a fixed length, and the additional data may be data slot packet identifiers in a system where several data slot packet types are utilized. The bit pattern may be either an error detection or error correction bit pattern. The algorithms, then, may be those used to calculate the error detection or correction, such as CRC polynomials. These may be stored in the memory as a representation of the algorithm, or as a look-up tables used to efficiently process the algorithm.

Respecting the encoder, this may be of the type that interleave the data packet with the bit pattern, likewise, the decoder de-interleaves the data packet from the bit pattern.

In an illustrative embodiment, the communications medium is a radio link.

At the receiving end, the controller operates to calculate a verifying bit pattern in accordance with each of the extracted data. The controller assigns the one of the plurality of additional data corresponding to the presently selected algorithm upon finding equality between more than just one of the plurality of verifying bit patterns and the plurality of extracted bit patterns.

The system may operate so that the several additional data are a plurality of data slot identifiers linked to a respective plurality of data slot packets. When the necessary equality is found, the controller operates to assign the present one of the plurality of data slot packet identifiers to align the continuous stream of data slot packets between the transmitter and receiver portions of the system.

An illustrative embodiment of the present invention is a method of communicating additional data in a data communication system. The method includes the steps of selecting one of a plurality of algorithms corresponding to additional data and calculating a bit pattern in accordance with a data packet and the selected algorithm. Then, inserting the data packet and the bit pattern into a data slot packet and transmitting said data slot packet over a transmission medium.

At the opposite end, the steps of receiving the data slot packet and extracting the data packet and the bit pattern from the data slot packet. Then, sequentially selecting from the plurality of algorithms and calculating a verifying bit pattern for each presently selected algorithm. Upon finding equality between the verifying bit pattern and the extracted bit pattern, linking additional data corresponding to the presently selected algorithm to the extracted data. Refinements similar to the previously described system are also applicable to the disclosed method.

BRIEF DESCRIPTION OF THE DRAWINGS

FIG. 6 is a data diagram of a data packet in a data slot in an illustrative embodiment of the present invention.

FIG. 7 is a data diagram of a data packet in an illustrative embodiment of the present invention.

FIG. 8 is a data diagram of a data packet in an illustrative embodiment of the present invention.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
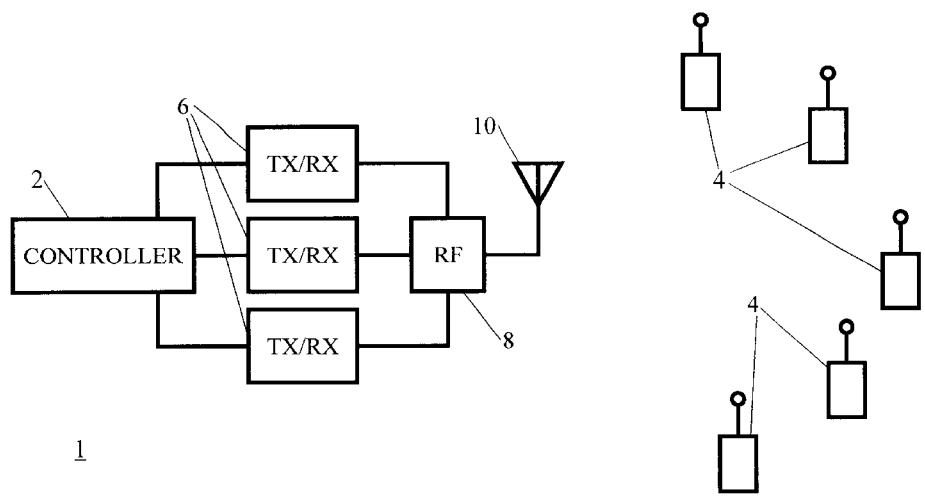
FIG. 1 is a block diagram of a radio communications system used in an illustrative embodiment of the present invention.

The preferred embodiment utilizes the present invention is a trunked land mobile radio system that employs packetized data for channel trunking management, system control, data communications and voice communications. Reference is directed to FIG. 1, which is a block diagram of such as system. The system includes a repeater base station 1 and a number of radio terminal units 4. The base station 1 has a controller 2, which serves to control and interconnect several radio repeaters 6. In FIG. 1, three repeaters are shown, however, those skilled in the art understand that the number of repeaters is dependent upon the radio spectrum allocated to the system and may range form one to twenty, or more, radio channels, and hence, one to twenty or more radio repeaters 6. In the United States, spectrum allocation is under the control of the Federal Communications Commission (FCC). The controller 2 provides various kinds of control of the resources in the base station 1, including interconnecting radio and wireline communications resources, and generating and interpreting communication protocols, as will be more fully discussed hereinafter. The base station 1 includes radio frequency distribution and combining circuits 8 which interconnect that several radio repeaters 6 to one or more transmit/receive antennas 10.

Figure 2:
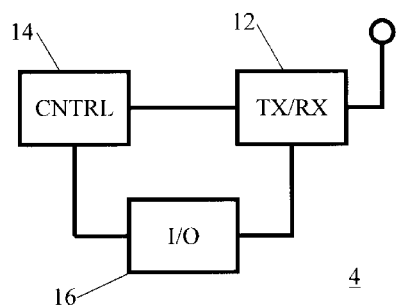
FIG. 2 is a block diagram of a radio terminal unit used in an illustrative embodiment of the present invention.

The terminal units 4 communicate via radio frequency waves (not shown) with base station 1 via antenna 10. Reference is directed to FIG. 2, which is a functional block diagram of a typical terminal unit 4. The terminal unit includes a controller 14 interconnected to a radio transceiver 12, which couples through an antenna to the base station 1. The terminal unit controller 14, which typically includes some memory, provides various control functions in the terminal unit including managing the channel trunking operations, system control, data communications, and voice communication through the terminal unit 4. The controller 14 also interfaces with a man-machine interface 16 (I/O) that allows for user interaction with the terminal unit 4. The man-machine interface includes audio input and output, user selectable functions, data input and output and so forth, as is understood be those skilled in the art. Data communications through a terminal unit may also be with a separate computer device, not shown.

Figure 3:
FIG. 3 is a diagram of the radio spectrum utilized in an illustrative embodiment of the present invention.

In an illustrative embodiment, the land mobile radio system operates in the US SMR band of frequencies that are allocated by the FCC. Reference is directed to FIG. 3, which is a spectrum diagram 18 of a typical spectrum allocation in the SMR band of frequencies. The US SMR band is defined as the range of frequencies from 806 MHz to 821 MHz and from 851 MHz and 866 MHz. Both ranges of frequencies are divided into 25 kHz channels with the lower range of frequencies being referred to as 'reverse' channels and the higher range of frequencies as 'forward' channels. Forward channels being utilized for transmission from the base station to the terminal units and reverse channels for transmissions from terminal units to base stations. Following the three channel example used earlier, the spectrum 18 has three reverse channels 20, which are typically assigned at one megahertz intervals, in the range of frequencies form 806 MHz to 821 MHz, and, three forward channels 22 in the range of frequencies from 851 MHz to 866 MHz. The channels are paired, one forward channel with one reverse channel, offset by 45 MHz. It is understood that any suitable band of frequencies would be usable in the preferred embodiment, such as the VHF band, the UHF band, or any other radio band.

Figure 4:
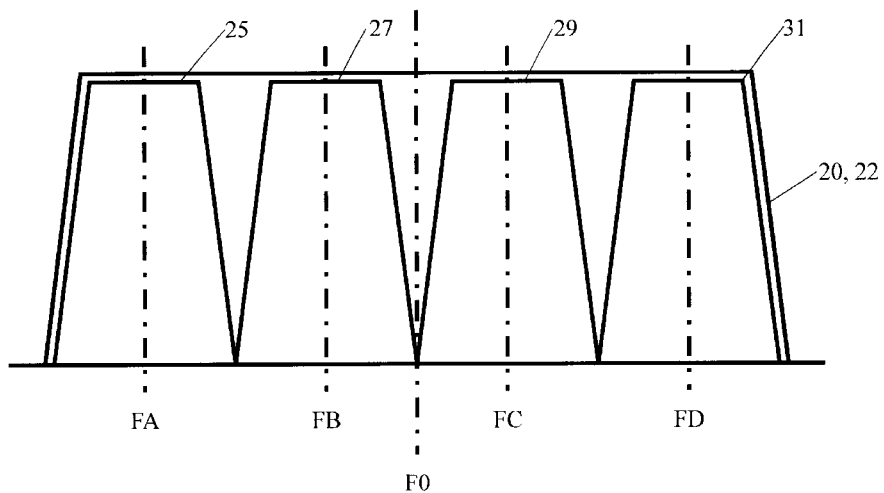
FIG. 4 is a diagram of the spectral frequency division in an illustrative embodiment of the present invention.

In the preferred embodiment, the allocated channels are advantageously sub-divided to improve capacity as is illustrated in FIG. 4. Each of the forward radio channel bands 22 (and each of the reverse channel bands 20) centered around frequency F0 are subdivided with up to four sub-bands 25, 27, 29, and 31, which each are centered about a sub-carrier FA, FB, FC, and FD, respectively. Each of the sub-carriers is independently modulated and utilized as a communications resource. Thus, up to four terminal units may occupy each allocated radio channel because each will receive and transmit within one of the four sub-bands.

Figure 5:
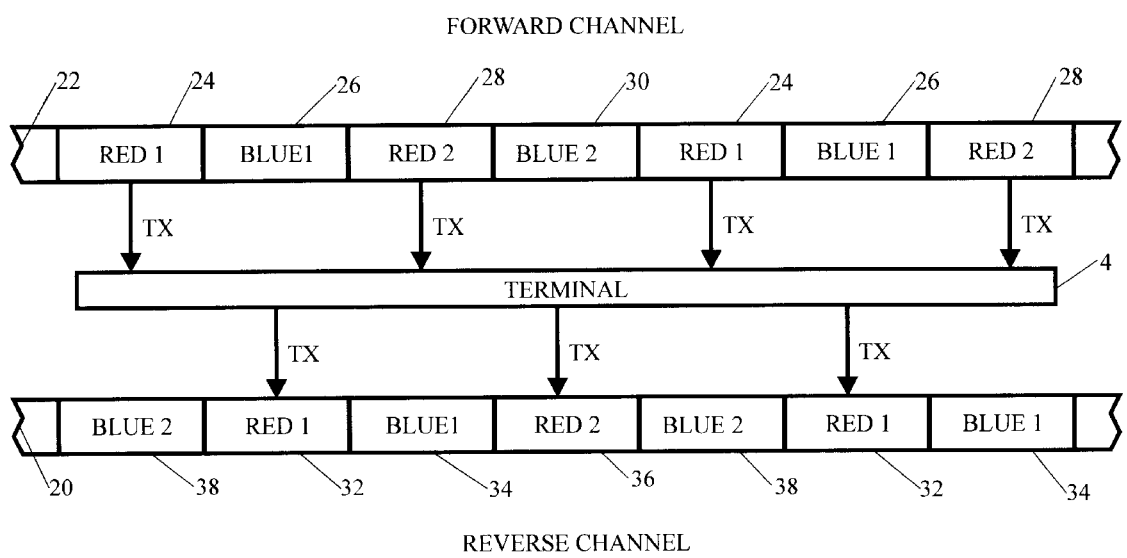
FIG. 5 is a data timing diagram showing the data slot arrangement in an illustrative embodiment of the present invention.

A further advantageous use of the radio spectrum by the preferred embodiment is illustrated in FIG. 5. Each of the sub-carriers is digitally modulated and time division multiplexed to allow two, or more, communications sessions to co-occupy the same radio frequency sub-band. For further details, see co-pending U.S. patent application Ser. No. 09/295,660 filed Apr. 12, 1999 entitled BANDWIDTH EFFICIENT QAM ON A TDM-FDM SYSTEM FOR WIRELESS COMMUNICATIONS, the contents of which is hereby incorporated by reference thereto. One sub-channel of a forward channel 22 and the corresponding sub-channel of a reverse channel 20 are illustrated in FIG. 5. Each communication session comprises a stream of data packets that are transmitted on the appropriate channel and sub-channel as are defined by the system protocol. The choice of which is made at the time the system is programmed. The data transmitted includes channel trunking and control data, data communications data, and digitized voice data, which are all interleaved within the data packets. The two discrete TDM communication sessions are arbitrarily defined as the RED and BLUE sessions. In the preferred embodiment, the individual sessions are further segmented into a first and second TDM packet slot, thus in the continuous stream of data packets there are RED1, BLUE1, RED2 and BLUE2 data slots. Therefore, as illustrated in FIG. 5, the forward channel 22 comprises a stream of data slot packets transmitted by the base station as RED1 24, BLUE1 26, RED2 28 and BLUE2 30, which repeats indefinitely. Similarly, the reverse channel 20 comprises a stream of data slot packets transmitted by the terminal units as RED1 32, BLUE1 34, RED2 36 and BLUE2 38, which also repeat indefinitely, so long as the terminal unit is transmitting.

In operation, the terminal units, illustrated as block 4 in FIG. 5, alternate between receiving a data slot packet on the forward channel and transmitting a data slot packet on the reverse channel. For efficient terminal unit communications, the timing relationship between the forward channel and reverse channel is staggered so that the forward channel RED packet slots align in time with the reverse channel BLUE packet slots. The transmit/receive switching in the terminal units is thus efficiently managed.

In the preferred embodiment, the modulation scheme employed is 16 constellation QAM, therefore, each symbol transmitted represents four bits of binary data. FIG. 6 is a data diagram of the typical data slot packet in the preferred embodiment. Within each packet is a 3 symbol synchronization word 42, three components of voice, (or data communications) data 44, 48, and 52, which each comprise 32 symbols, and, three components of control data 46, 50, and 54, which each comprise 7 symbols. Therefore, there are 21 symbols of control data, or 84 bits of control data within each data slot packet. See the referenced co-pending application for further details.

FIG. 7 and FIG. 8 are data diagrams of the control data transmitted in each of the first and second data packets for each session, respectively. For example, the RED1 and RED2 data slot packets. The specific data fields in the first data slot packet 56, as shown in FIG. 7, includes nineteen bits of LTR trunking control data 58, nine bits of frequency control data 60, one bit of counter data 62, three bits of power control data 66 and 10 bits of error detection data 67. Similarly, in FIG. 8, the second data slot packet 68 includes five bits of LTR trunking control data 70, nine bits of frequency control data 72, sixteen bits of system control data 74, three bits of power control data 76 and nine bits of error detection data 78. The quantity of control data bits in each data slot packet adds to 42 bits. As noted above, there are 84 bits of control data transmitted. As will be discussed more fully hereinafter, the data in the preferred embodiment are rate one-half convolutional encoded for error correction robustness and therefore the quantity of bits is double, so 84 bits are required to transmit 42 bits of data.

Figure 9:
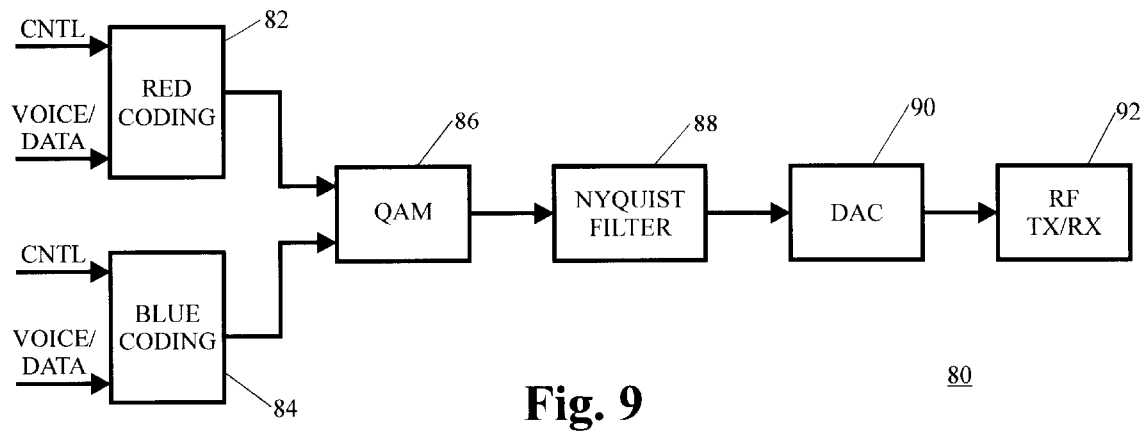
FIG. 9 is a functional block diagram of a transmitter system in an illustrative embodiment of the present invention.

Reference is directed to FIG. 9, which is a functional block diagram of a typical data transmitter used in the preferred embodiment. In the case of the base station, the components shown in FIG. 9 are distributed between the base station controller and the radio repeater. In the case of a terminal unit, the components shown in FIG. 9 are distributed between the controller and the transceiver. Note that in the terminal unit, only a single coding block 82 or 84 are required as the terminal unit is design to participate in just one communications session at any given time.

The data transmitter, as shown in FIG. 9 includes a RED coding unit 82 and a BLUE coding unit 84. The coding units 82, 84 receive trunking and control data from a controller (not shown) and receive voice and/or data communications data from another portion of the base station or terminal unit (not shown). The controller which provides the trunking and control data is typically a microprocessor, microcontroller, or application specific device designed for implementation of the preferred embodiment trunking system. Voice data is typically provided to and from a microphone and related circuitry and a loudspeaker and related circuitry respectively, although other sources may be utilized as is understood by those skilled in the art. The output of the data coding blocks is a data stream that is fed to a QAM modulator 86 where it is modulated onto a carrier and subsequently wave-shape filtered by Nyquist filter 88. The signal is subsequently converted to analog by digital to analog converter 90 before being fed to the radio frequency transceiver 92 for subsequent coupling to an antenna (not shown).

Figure 10:
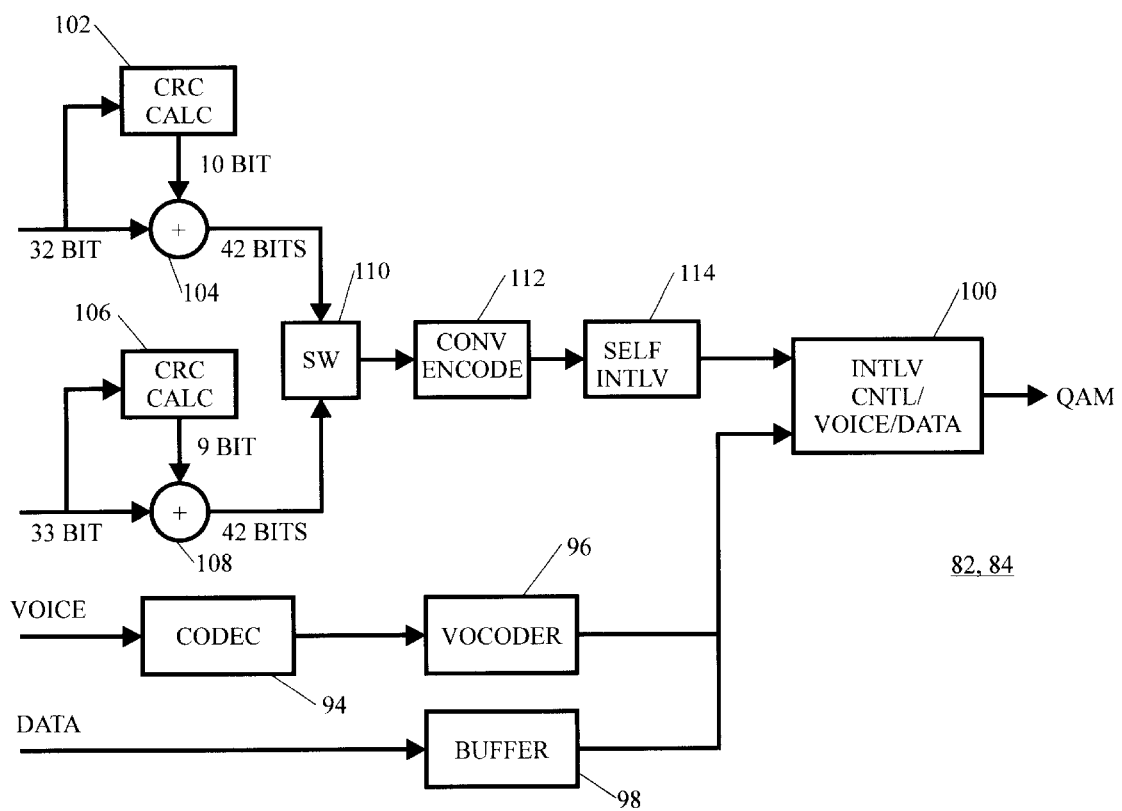
FIG. 10 is a functional block diagram of a data coding circuit in an illustrative embodiment of the present invention.

The functional content of coding blocks 82 and 84 are shown in FIG. 10. Briefly referring back to FIGS. 7 and 8, it will be noticed that the data content, excluding the error detection bits, of the first and second data packet slots is 32 bits and 33 bits respectively. This is by definition of the protocol and establishes the packet size in the preferred embodiment. Referring again to FIG. 10, two streams of control data are provided to coding block 82 and 84. These two streams are for packets one and two respectively for each of the RED and BLUE coding blocks. The 32 bits of control data for the first data slot packet are provided into error detection calculation block 102 and summing junction 104. Likewise, the 33 bits of control data destined for the second data slot packet are provided to error detection calculation block 106 and summing junction 108. The error detection calculation block in the preferred embodiment is a CRC (cyclic redundancy check) error detection system. The summing junctions 104 and 108 encode the control data with the error data by combining them to form a data packet that comprises both the control data and its error detection CRC data. Both are fed to switch 110 which time interleaves the data packets according to the aforementioned timing protocol.

The output from switch 110 is a continuos stream of data packets, each 42 bits in length. These data packets are encoded by rate ½ convolutional coder 112 which doubles the packet sizes to 84 bits, as is well understood in the art. Following encoding, the bits are self interleaved in block 114 which serves to mitigate the data loss experienced by burst of noise, as is typically experienced in a radio communications medium. This aspect of the system is well understood by those skilled in the art.

On a parallel track in FIG. 10, voice signals are received and encoded by CODEC 94 before being compressed by vocoder 96. Data communications data is received in buffer 98. All of the voice data, data communications data, and control data packets are received by interleaver 100. Within interleaver 100, the data are assembled into packets as generally described in FIG. 6 for subsequent modulation by QAM modulator 86. It should be understood that the interleaving process scrambles the data among itself and the data structure demonstrated in FIG. 6 is exemplary only.

The error correction calculation process carried out by blocks 102 and 106 in FIG. 10 will now be more fully developed. There are a great number of error detecting and correcting schemes available to those skilled in the art. Certainly, new schemes are conceived of on a frequent basis, and any of these may be usable in the present invention. The preferred embodiment of the present invention uses a cyclic redundancy check (CRC) approach to error detection, in addition to a convolutional encoder for error correction. The CRC process involves using the data to be transmitted as an argument to an error bit calculating algorithm for producing a set of error detection bits that are transmitted together with the control data. At the receiving end, errors are detected by performing the same analysis using the known algorithm and comparing the error correction bits extracted from the received data with those calculated at the receiving end. If no discrepancy is found, then there is a high confidence that the data bits were transmitted without error. In the preferred embodiment, a novel application utilizing a plurality of algorithms is used to advantageously increase the quantity of information transmitted without increasing the number of bits in each packet. Specifically, a plurality of algorithms represent the data slot packet identifiers (RED1, BLUE1, RED2, and BLUE2) so that the terminal unit can identify the data slot packets and align itself with the streaming flow of data slot packets at the time it acquires a channel without the need to add bits to the packets for the purpose of identifying which data slot packet they are.

Respecting the formation of the data slot packet control and error detection bits, note that each instance of control information requires a total of 65 bits (see FIGS. 7 and 8). The 65 bits are divided into two packets: one data packet of 32 bits and one data packet of 33 bits. CRC bits are then added to each data packet and the packets of information are interleaved in two sequential RED and two sequential BLUE data slot packets. The CRC bits are used in the receiver to detect uncorrectable errors and also to determine which slot is presently being received. The determination of which slot is presently being received is most valuable at the time a mobile unit acquires a communications resource, or channel, because knowing which data slot packet is being received allows the terminal unit to align itself with the streaming flow of data packets. As mentioned above, this is accomplished without additional control or CRC bits by employing four different CRC algorithms, or polynomials, to produce four different CRC's: a 10-bit CRC for the RED1 slot; a 10-bit CRC for the BLUE1 slot; a 9 bit CRC for the RED2 slot, and a 9 bit CRC for the BLUE2 slot. The resulting 42 bit packets are transmitted in sequential RED or BLUE slots, as was described earlier.

Subsequent to the CRC bit encoding, forward error correction using a convolutional code with rate ½ results in 84 bits in each slot. These 84 bits are then interleaved with themselves to improve system noise performance.

More specifically, CRC bits are calculated from the input data using a generator polynomial. The generator polynomial is chosen by testing a number of candidate maximal length polynomial generators of order one less than the required length of the generator polynomial, and selecting the required polynomial as $(1+x)p(x)$, (where $p(x)$ is the chosen primitive polynomial). In the preferred embodiment, the CRC described here is used to validate the trunking and control data sent from the base station to the terminal unit. It will be understood by those skilled in the art that there are several different approaches to calculating CRC bits, and that new approaches may be developed from time to time. These various approaches should be understood to be interchangeable respecting the present invention, and the claims appended hereto are intended to cover all such variants.

Several methods may be used to generate the CRC bits. After the data bit stream has been calculated, the data polynomial is multiplied by $x^a$ (where a is the number of CRC bits), and the resulting data polynomial is divided by the generator polynomial, $H(x)$, which equals $(1+x)p(x)$. The remainder constitutes the CRC check bits. A large matrix may also be used with binary matrix multiplication to achieve the same result. However, one of the most code-efficient methods of generating the CRC bits is to use a look-up table plus a bit by bit "exclusive or" operation (hereinafter 'XOR'). All three of these methods can be used to generate the same CRC check bits. The XOR method is preferred since it is the most computation efficient of the three models listed.

As previously mentioned, there are a variety of ways to calculate CRC bit patterns. The design choices made in the preferred embodiment are based on the preferred embodiment communications system design and available processor and memory technology. In other embodiments, there may be other design considerations that dictate other approaches, or, there may be advancement in memory or processor technology, which lead to more or less code/memory efficient approaches. These design considerations are understood to those skilled in the art as mere substitutes for the teachings and claims made herein.

In application of the XOR method of CRC bit determination, tables are produced to store the data used in the CRC calculation, as in the preferred embodiment. The tables are generated using all possible combinations of 8-bit data (decimal 0 to 256) and dividing the 8-bit polynomial data (multiplied by $x^a$ where a is either 9 or 10 depending on the number of CRC bits required) by the generator polynomial. For example, in with a table entry of "011011100' for the eight bit binary number '1' or '00000001' the bits in the table entry are generated from the second byte of data represented by a decimal 1. In binary, decimal 1 is represented as '00000001" or $x^7$ as a polynomial (where the right most bit is highest order bit). $x^7$ is multiplied by $x^9$, which equals $x^{16}$. $x^{16}$ is then divided by the generator polynomial, $H(x)$, to get a remainder. The binary representation from the table is calculated from the remainder polynomial using the right most bit as the coefficient of the highest order term of the polynomial.

In the receiver, CRC calculations occur after the convolutional decoding has occurred. The control data is de-interleaved and then taken 8 bits at a time. For example, in the case of a 9-bit CRC, seven least significant zeros are added to bring the message length for 33 to 40 bits (an even multiple of 8 bits). Eight bits at a time are converted to decimal equivalent representation and used to look up the remainder terms in the table for the given polynomial. The remainder is 9 bits long and is XOR'd with the next 9 bits in the decoded message. After XOR'ing the 9 bits, the next eight bits are taken and the 9 bit remainder again XOR'd with the next 9 bits in the decoded message. This process is continued until the last two 8 bit bytes in the process are encountered. Processing the second to the last 8 bits gives a 9 bit remainder and only the 8 most significant bits are used for the XOR operation for the last byte. After the XOR operation on the last byte, a table look up is made to get the final 9 bit remainder. The remaining bit from the table look up is used to get the final 9 bit remainder. The remaining bit from the table look up for the second to the last byte is prepended with 8 zeros to give '00000000$b_1$,' where $b_1$ is the last remainder bit, and the result is XOR'd with the 9 bit remainder from the final table look up to yield the 9 CRC check bits. These 9 bits are then compared to the 9 bit CRC extracted from the decoded message. Any bit mismatch between the calculated CRC and the decoded CRC indicates corrupted control data, or corrupted CRC bits. In either event, the data is not used.

In the preferred embodiment of the present invention, four CRC polynomials are used instead of one. Each polynomial is linked to one of the RED1, BLUE1, RED2, or BLUE2 data slot packets. As such, four look up tables are employed in the terminal unit data receiver. Therefore, a packet slot identifier may be determined by sequentially applying the CRC calculations in turn until a successful match is found, thus indicating which CRC polynomial was used, and therefore, which data slot has been received. Once the acquisition is complete, the receiver is synchronized with the transmitter and the data slot identifier for subsequent data slots will be known. In the preferred embodiment, suitable CRC polynomials that could be used are:

| | |
|---|---|
| RED1: | $1+x+x^5+x^6+x^9+x^{10}$ |
| BLUE1: | $1+x+x^4+x^5+x^6+x^8+x^9+x^{10}$ |
| RED2: | $1+x^2+x^6+x^9$ |
| BLUE2: | $1+x^3+x^7+x^9$ |

The selection of these polynomials is accomplished by modeling the process in software and running extensive tests to determine the probability that an error will be undetected in the CRC check process. In the prior art, the goal was to select the one polynomial that yielded the absolute lowest probability of an undetected error for a given set of criteria. In the present invention, it is realized that several polynomials are available that offer an acceptably low probability of undetected error and which are therefore acceptable in practical application within a data communications system.

No polynomial will yield a probability of zero, so that is always a chance that an error will go undetected. Likewise, there is a probability that a CRC check will pass as a result of complimentary errors, and the present invention would then misalign the data slot packet sequence. Also, it is possible that two different polynomials will produce the same CRC bit pattern for the same data set. This possibility increases with fewer CRC bits and a greater number of different polynomials. For this reason, in the preferred embodiment, the declaration of channel acquisition is not made by merely detecting one correct CRC test, although such an approach may be valid in a system with different design criteria.

In the receiver, after the convolutional decoding has occurred, the received 9 or 10 bit CRC is extracted from the data slot packet. The CRC is calculated from the packet data and compared to the extracted CRC bits. Three out of four error free comparisons constitute a final acquisition criterion. Acquisition includes determination of the RED/BLUE slot structure and location of control data that is, distinguishing RED1 from RED2 and BLUE1 from BLUE2.

Figure 11:
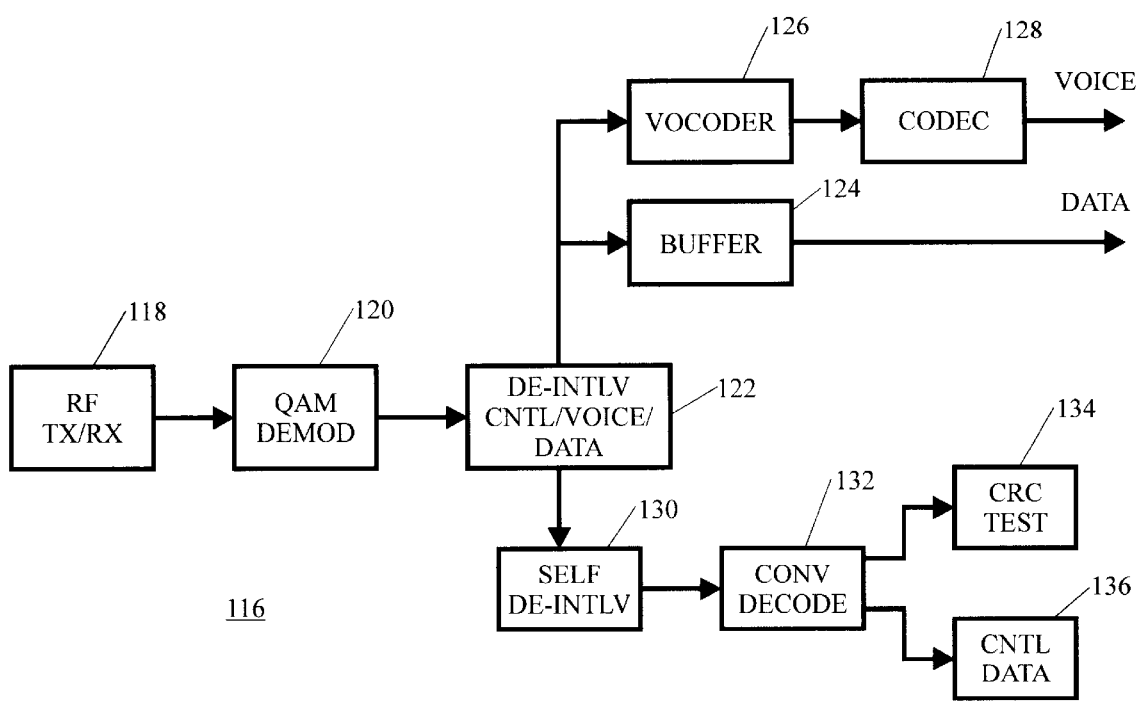
FIG. 11 is a functional block diagram of a receiver and data decoding circuit in an illustrative embodiment of the present invention.

Reference is directed to FIG. 11, which is a functional block diagram of the data receiver 116 in the preferred embodiment of the present invention. This diagram is a higher level review of the decoding process that was just previously described. A radio frequency transceiver 118 in the terminal unit receives the modulated carrier as described earlier. The QAM demodulator 120 demodulates the signal and provides the continuous bit stream to de-interleaver 122, which de-interleaves the control data from the voice data and data communications data. Respecting voice and data communications data, these are directed to vocoder 126 and data buffer 124 respectively. The voice data is expanded by vocoder 126 and coupled to CODEC 128 which converts the digital voice signal to analog for reproduction in the user interface of the terminal unit (not shown), typically to a loud speaker. The data communications data is coupled to data buffer 124 is coupled to the user interface (not shown) or to an external data terminal (not shown) such as a portable computer.

Figure 12:
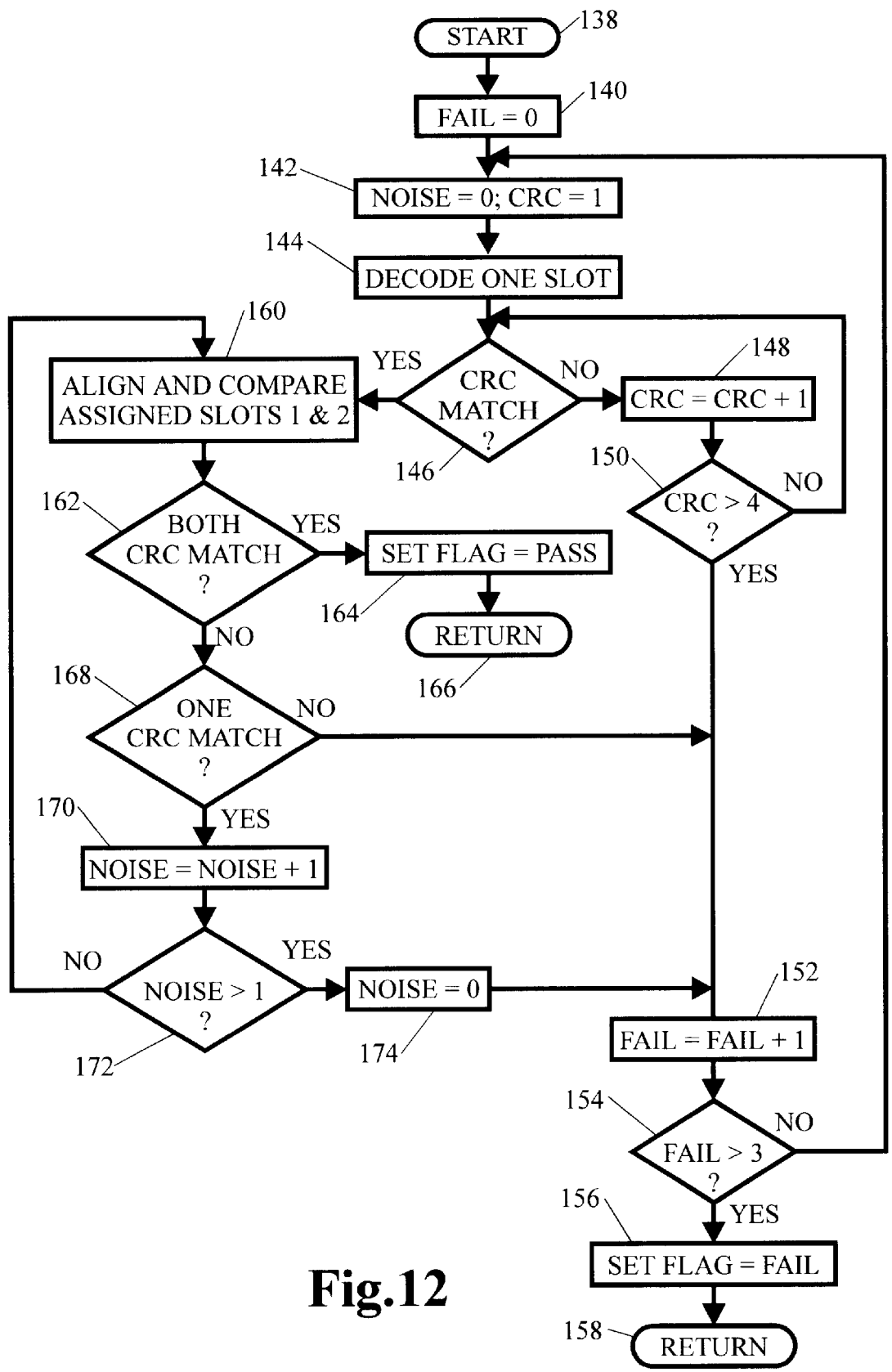
FIG. 12 is a flow diagram of a data slot identification method in an illustrative embodiment of the present invention.

The control data output from de-interleaver 122 is coupled to self-de-interleaver 130 which places the bit sequence in the original order prior to the self-interleaving process that was discussed respecting the data transmitter. The data packets are then coupled to convolutional decoder 132 for error correction and processing to the original data packet sequence. Note that at this point, the data slot packets are reduced from, 84 bits in length to 42 bits in length. The 42 bit packets are split into the control data in block 136 and the CRC data in block 134. The terminal unit processor (not shown) is coupled to control data block 136 and CRC test block 134 and reads the control data and CRC bits. The processor also calculates CRC bits according to each of several CRC generator polynomials, or algorithms, for comparison to the received CRC bits. A finding of equality therebetween indicates a high confidence that the data was communicated error free and that the TDM slot is the same as that linked to the generator polynomial used for the successful test. The preferred embodiment method is described more fully as follows:

Reference is directed to FIG. 12, which is a flow diagram of the CRC bit testing and TDM slot identification process in the preferred embodiment of the present invention. The entry point from other processes in the terminal unit is block 138. A variable FAIL is set to zero. This variable is used as a counter of the number of times a CRC bit test has failed. Next, the variable NOISE is set to zero and the variable CRC is set to one. The NOISE variable is used to count the number of failed CRC bit tests that occur after a successful bit test, and generally indicates that some form of noise has impeded that communications process, as opposed to a complete failure of the communications process, such as when the terminal unit is out of radio range from the base station. The variable CRC is used to index the algorithms that reside in memory so that the processor can keep track of which of the plurality of generator polynomial algorithms is presently selected, and whether all of the algorithms has been processed.

At block 144, the processor decodes one slot, which includes extracting the control data and the received CRC bits from the received data slot packet, and the process of applying the first CRC algorithm to the extracted control data to calculate the CRC bits accordingly. A test of whether the extracted CRC bits match the calculated CRC bits is conducted at block 146. If there is no match, the test is failed and the CRC variable is incremented at step 148. Next, the CRC variable is checked at step 150 to determine if all four of the CRC polynomial algorithms has been tested. If not, then flow recycles to block 146 where the next CRC algorithms is processed and compared. If, at block 50, all four of the CRC algorithms has been tested, then the processor has found no match so an error of some sort must have occurred. This indicates a failure in the communications process has occurred so the FAIL variable is incremented at step 152. The process in the preferred embodiment is designed to make four attempts before giving up so the FAIL variable is tested at step 154 to determine if it is greater than three. If not, flow recycles to step 142 and begins anew by resetting the pertinent variables and decoding another slot for testing. On the other hand, at step 154, if there have been four failed tests, a flag is set to FAIL at step 156 and the process returns at step 158. The flag that is set to FAIL is used by other processes in the terminal unit, such as for indicating, through the user interface, that no radio communications are presently possible.

Referring again to step 146 in FIG. 12, if a CRC bit match between the extracted CRC bits and the calculated CRC bits is successful, the flow proceeds to step 160 where the terminal unit receiver is aligned with the data slot packet flow and the processor checks the subsequent number 1 and number 2 slots using the aforementioned CRC bit test. It should be understood that at step 146, where the CRC bit test succeeded, the processor checks the slot assignment linked to the then presently selected CRC algorithm and identifies the data slot packet being tested. Since the processor knows the slot sequence (e.g. RED1, BLUE1, RED2, BLUE2) once a single slot is identified, the terminal unit is aligned with the data flow so that subsequent tests can be conducted without the need to test all four CRC algorithms. Rather, the appropriate algorithm is selected to match the presently received data slot packet. Another aspect of the trunking protocol used in the preferred embodiment, is that when a particular talk group, or 'channel' is selected by a user, and the trunking protocol is accessed, the terminal unit has assigned to it a particular radio channel, sub-band, and TDM time slot. The terminal unit might be assigned, for example, to the BLUE TDM time slot. Therefore, at step 160, when the terminal is aligned and tests the one and two slots, it would test only the slots it has been assigned to, in this example BLUE1 and BLUE2.

Continuing to step 162, if both CRC bit tests succeed, then the flag is set to PASS at step 164 and the process returns at step 166. The flag set to PASS is used by other processes in the terminal unit to indicate that radio communications are possible and that a communications channel and TDM time slot have been identified and synchronized with. On the other hand, at step 162, if both CRC bit test do not match, then the process tests whether one has matched at step 168. If one matches and the other does not, this is an indication that a random noise event has impeded communications as opposed to a complete failure of communications. This test also reduces the chance that the first successful CRC bit test occurred as a result of a random pair of errors that cancel each other's deleterious effect. If, at step 168, neither CRC test matched, then the process flows to step 152 where the FAIL variable is incremented. Assuming four failures haven't yet occurred, the process returns to the beginning to begin the process anew. If, at step 168, one CRC bit test failed, then flow proceeds to step 170 where the NOISE variable is incremented. As mentioned previously, this variable accumulates the number of random noise occurrences. At step 172 the NOISE variable is tested to determine if it is greater than one. In the preferred embodiment, one noise event is tolerated in each test sequence before a failure is declared. In other embodiments, this number may differ. Therefore, at step 172, if the NOISE variable is not greater than one, flow recirculates to step 160 where the slots are again aligned and tested as described earlier. On the other hand, at step 172, if the NOISE variable is greater than one, then a failure is declared, the NOISE variable is set to zero at step 174 and the process flows to step 152 where the FAIL variable is incremented as described earlier.

It will be understood by those skilled in the art that the choices of how many tests to be made and when to declare noise versus a failure may be determined statistically or empirically. They are influenced by the speed and processing power of the terminal unit processor, the performance of the communications medium, the environment noise, and other factors. The choices made in the preferred embodiment reflect those factors but do not limit the scope of the invention to those factors.

Those skilled in the art will appreciate that the preferred embodiment represents but one of a virtually limitless number of communications systems that can benefit from the present invention. Modern communications systems are designed and then evolve to meet market requirements. The trend is for ever increasing demands on data capacity. However, backward compatibility is always a real market factor too. In a data communication system where protocols are set and packet sizes fixed, it is a continuing challenge for system designers to increase performance under such constraints. The present invention provides a novel approach to this dilemma. In an essential view, any time a set of data are manipulated by an algorithm to produce additional data that is placed in a data packet, the choice of algorithms may be varied so that new information can be introduced according to the number of algorithms which replace the original algorithm. Clearly, error detecting and correcting algorithms meet these basic criteria, but other do as well.

Figure 13:
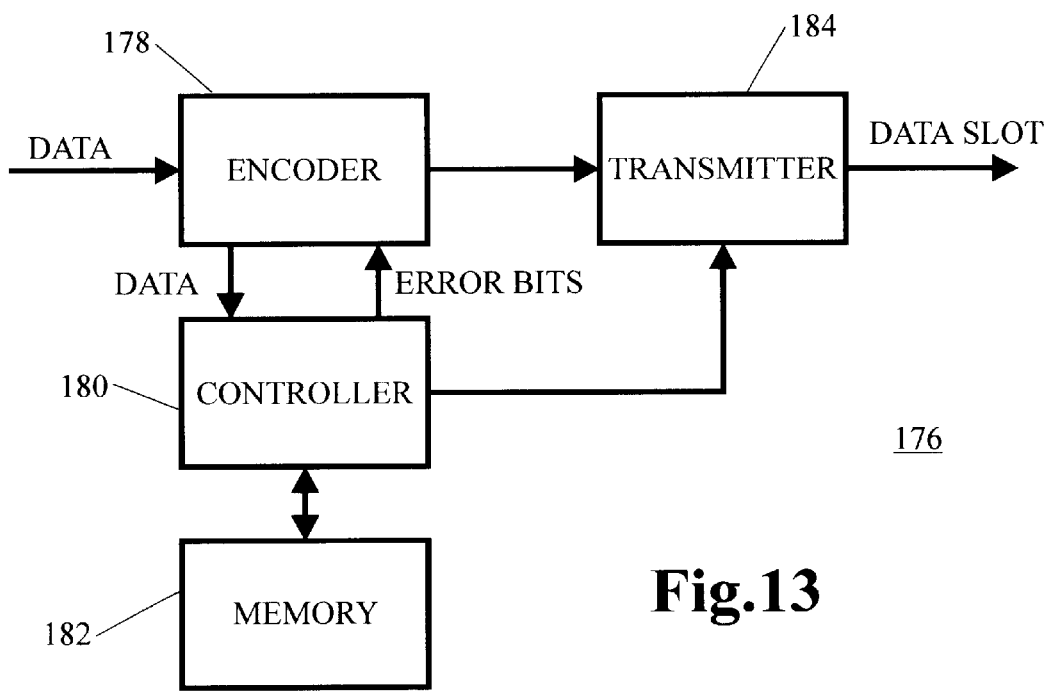
FIG. 13 is a functional block diagram if a data transmitter in an illustrative embodiment of the present invention.
Figure 14:
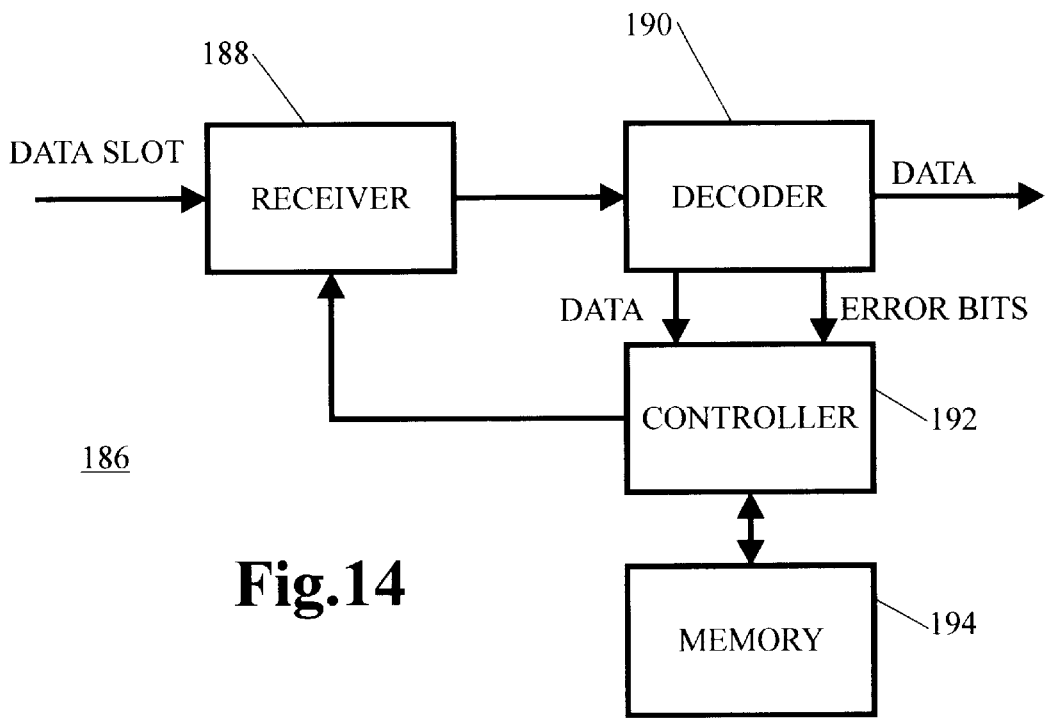
FIG. 14 is a functional block diagram of a receiver in an illustrative embodiment of the present invention.

FIGS. 13 and 14 are functional block diagrams of a data transmitter and data receiver, respectively that embody the broader present invention. The data transmitter in FIG. 13 includes an encoder 178 which receives data and encodes it with error bits that controller 180 calculates according to one of a plurality of algorithms stored in memory 182. The algorithms stored in memory 182 are linked to additional data, perhaps data slot identifiers. The encoded data slot packets are coupled to transmitter 184 for coupling to a communications medium. The medium may be any of those utilized by those skilled in the art. In the preferred embodiment it is radio, but it can be metallic, optic, or even acoustic channels. Any can benefit from the present invention.

The data receiver, in FIG. 14 includes a receiver that is coupled to the communications medium and receives that data slot packets and couples them to decoder 190. The decoder 190 extracts the data packets and error bits and provides them to controller 192. Controller 192 sequentially recalls the plurality of algorithms from memory 194 and calculates the error bits according to the data packet. The calculated error bits are compared to the extracted error bits with equality indicating a high confidence that a match has occurred. The plurality of algorithms in memory 194 are linked to a plurality of additional data, the same additional data as is stored in data receiver memory 182, so that the receiver controller determines the additional data not by direct communications but by the sequential testing of a plurality of algorithms.

Thus, the present invention has been described herein with reference to a particular embodiment for a particular application. It is therefore intended by the appended claims to cover any and all such applications, modifications and embodiments within the scope of the present invention.

What is claimed is:

1. A data communication system for communicating additional data; comprising:
   a data transmitter, further comprising:
      an encoder having an input for receiving a data packet and operable to form a data slot packet by inserting thereinto said data packet and a bit pattern;
      a first memory having stored therein a plurality of algorithms corresponding to a plurality of additional data;
      a first controller coupled to said first memory and operable to recall at least one of said plurality of algorithms in accordance with a specified additional data, said first controller coupled to said encoder and operable to calculate said bit pattern, in accordance with said data packet and said recalled algorithm, for insertion into said data slot packet;
      a transmitter coupled to said encoder and operable to transmit said data slot packet, and
   a data receiver, further comprising:
      a receiver operable to receive said data slot packet;
      a decoder coupled to said receiver and operable to extract said data packet and said bit pattern therefrom;
      a second memory having stored therein said plurality of algorithms and said plurality of additional data, and
      a second controller coupled to said decoder and operable to receive said extracted data packet and said extracted bit pattern therefrom, said second controller coupled to said second memory and operable to sequentially recall said plurality of algorithms therefrom and to calculate a verifying bit pattern in accordance with said extracted data packet, and upon finding equality between said verifying bit pattern and said extracted bit pattern, assign the one of said plurality of additional data corresponding to the presently selected algorithm to said received data packet.

2. The system of claim 1, and wherein said data slot packet has a predetermined length.

3. The system of claim 1, and wherein said additional data is a data slot packet identifier.

4. The system of claim 1, and wherein said bit pattern is an error correction bit pattern.

5. The system of claim 1, and wherein said plurality of algorithms implement a plurality of error detection polynomials.

6. The system of claim 1, and wherein said plurality of algorithms are implemented as a plurality of look-up tables.

7. The system of claim 1, and wherein said encoder interleaves said data packet with said bit pattern, and wherein said decoder de-interleaves said data packet from said bit pattern.

8. The system of claim 1, and wherein said transmitter and said receiver are coupled by radio link.

9. The system of claim 1, and wherein said second controller is operable to calculate a plurality of verifying bit patterns in accordance with a plurality of extracted data and said second controller assigns one of said plurality of additional data corresponding to said presently selected algorithm upon finding equality between more than one said plurality of verifying bit patterns and a plurality of extracted bit patterns.

10. The system of claim 1, and wherein said bit pattern in an error detecting bit pattern.

11. The system of claim 10, and wherein said error bit pattern is a CRC error bit pattern.

12. The system of claim 1, and wherein said data slot packet is one of a plurality of data slot packets that are transmitted in a continuous stream of data slot packets.

13. The system of claim 12, and wherein said plurality of additional data is a plurality of data slot identifiers linked to a portion of said plurality of data slot packets.

14. The system of claim 13, and wherein said second controller is operable to assign the one of said plurality of data slot packet identifiers to align said continuous stream of data slot packets in said data receiver.

15. The system of claim 10, and wherein said error bit pattern varies in length dependent upon the data slot packet into which it is inserted.

16. A data transmitter for transmitting additional data in a data communication system; comprising:
   an encoder having an input for receiving a data packet and operable to form a data slot packet by inserting thereinto said data packet and a bit pattern;
   a memory having stored therein a plurality of algorithms corresponding to a plurality of additional data;
   a controller coupled to said memory and operable to recall one of said plurality of algorithms in accordance with a specified additional data, said controller coupled to said encoder and operable to calculate said bit pattern, in accordance with said data packet and said recalled algorithm, for insertion into said data slot packet, and
   a transmitter coupled to said encoder and operable to transmit said data slot packet.

17. The data transmitter of claim 16, and wherein said data slot packet has a predetermined length.

18. The data transmitter of claim 16, and wherein said additional data is a data slot packet identifier.

19. The data transmitter of claim 16, and wherein said bit pattern is an error correction bit pattern.

20. The data transmitter of claim 16, and wherein said plurality of algorithms implement a plurality of error detection polynomials.

21. The data transmitter of claim 16, and wherein said plurality of algorithms are implemented as a plurality of look-up tables.

22. The data transmitter of claim 16, and wherein said encoder interleaves said data packet with said bit pattern.

23. The data transmitter of claim 16, and wherein said bit pattern in an error detecting bit pattern.

24. The data transmitter of claim 23, and wherein said error bit pattern is a CRC error bit pattern.

25. The data transmitter of claim 16, and wherein said data slot packet is one of a plurality of data slot packets that are transmitted in a continuous stream of data slot packets.

26. The data transmitter of claim 25, and wherein said plurality of additional data is a plurality of data slot identifiers linked to a portion of said plurality of data slot packets.

27. A data receiver for receiving additional data in a data communication system; comprising:

a receiver operable to receive a data slot packet;

a decoder operable to receive said data slot packet from said receiver and to extract a data packet and a bit pattern therefrom;

a memory having stored therein a plurality of algorithms corresponding to a plurality of additional data, and a controller coupled to said decoder and operable to receive said extracted data packet and said extracted bit pattern therefrom, said controller coupled to said memory and operable to sequentially recall said plurality of algorithms therefrom and to calculate a verifying bit pattern in accordance with said extracted data packet, and upon finding equality between said verifying bit pattern and said extracted bit pattern, assigning the one of said plurality of additional data corresponding to the presently selected algorithm to said received data packet.

28. The data receiver of claim 27, and wherein said data slot packet has a predetermined length.

29. The data receiver of claim 27, and wherein said additional data is a data slot packet identifier.

30. The data receiver of claim 27, and wherein said bit pattern is an error correction bit pattern.

31. The data receiver of claim 27, and wherein said plurality of algorithms implement a plurality of error detection polynomials.

32. The data receiver of claim 27, and wherein said plurality of algorithms are implemented as a plurality of look-up tables.

33. The data receiver of claim 27, and wherein said decoder de-interleaves said data packet from said bit pattern.

34. The data receiver of claim 27, and wherein said controller is operable to calculate a plurality of verifying pit patterns in accordance with a plurality of extracted data and said controller assigns one of said plurality of additional data corresponding to said presently selected algorithm upon finding equality between more than one said plurality of verifying bit patterns and a plurality of extracted bit patterns.

35. The data receiver of claim 27, and wherein said bit pattern in an error detecting bit pattern.

36. The data receiver of claim 35, and wherein said error bit pattern is a CRC error bit pattern.

37. The data receiver of claim 27, and wherein said data slot packet is one of a plurality of data slot packets that are transmitted in a continuous stream of data slot packets.

38. The data receiver of claim 37, and wherein said plurality of additional data is a plurality of data slot identifiers linked to a portion of said plurality of data slot packets.

39. The data receiver of claim 38, and wherein said controller is operable to assign the one of said plurality of data slot packet identifiers to align said continuous stream of data slot packets in the data receiver.

40. A method of communicating additional data in a data communication system; comprising the steps of:

selecting one of a plurality of algorithms corresponding to additional data;

calculating a bit pattern in accordance with a data packet and said selected algorithm;

inserting said data packet and said bit pattern into a data slot packet;

transmitting said data slot packet;

receiving said data slot packet;

extracting said data packet and said bit pattern from said data slot;

sequentially selecting from said plurality of algorithms and calculating a verifying bit pattern for each presently selected algorithm, and upon finding equality between said verifying bit pattern and said extracted bit pattern, linking additional data corresponding to the presently selected algorithm to said extracted data.

41. The method of claim 40, and wherein said data slot packet has a predetermined length.

42. The method of claim 40, and wherein said additional data is a data slot packet identifier.

43. The method of claim 40, and wherein said bit pattern is an error correction bit pattern.

44. The method of claim 40, and wherein said plurality of algorithms implement a plurality of error detection polynomials.

45. The method of claim 40, and wherein said plurality of algorithms are implemented as a plurality of look-up tables.

46. The method of claim 40, and wherein said inserting step includes the step of interleaving said data packet with said bit pattern, and said extracting step includes the step of de-interleaving said data packet from said bit pattern.

47. The method of claim 40, and wherein said transmitting and said receiving steps are accomplished by radio link.

48. The method of claim 40, and wherein said calculating step further comprises the step of calculating a plurality of verifying bit patterns in accordance with a plurality of extracted data and upon finding equality between more than one said plurality of verifying bit patterns and a plurality of extracted bit patterns, linking additional data corresponding to the presently selected algorithm to said extracted data.

49. The method of claim 40, and wherein said bit pattern in an error detecting bit pattern.

50. The method of claim 49, and wherein said error bit pattern is a CRC error bit pattern.

51. The method of claim 40, and wherein said transmitting step further includes transmitting a plurality of data slot packets in a continuous stream.

52. The method of claim 51, and wherein said plurality of additional data is a plurality of data slot identifiers linked to a portion of said plurality of data slot packets.

53. The method of claim 52, further comprising the step of aligning said continuous stream of data slot packets according to said linked one of said plurality of data slot packet identifiers.

54. A method of transmitting additional data in a data communication system; comprising the steps of:

selecting one of a plurality of algorithms corresponding to additional data;

calculating a bit pattern in accordance with a data packet and said selected algorithm;

inserting said data packet and said pattern into a data slot packet, and transmitting said data slot packet.

55. The method of claim 54, and wherein said data slot packet has a predetermined length.

56. The method of claim 54 and wherein said additional data is a data slot packet identifier.

57. The method of claim 54, and wherein said bit pattern is an error correction bit pattern.

58. The method of claim 54, and wherein said plurality of algorithms implement a plurality of error detection polynomials.

59. The method of claim 54, and wherein said plurality of algorithms are implemented as a plurality of look-up tables.

60. The method of claim 54, and wherein said inserting step includes the step of interleaving said data packet with said bit pattern.

61. The method of claim 54, and wherein said bit pattern in an error detecting bit pattern.

62. The method of claim 61, and wherein said error bit pattern is a CRC error bit pattern.

63. The method of claim 54, and wherein said transmitting step further includes transmitting a plurality of data slot packets in a continuous stream.

64. The method of claim 63, and wherein said plurality of additional data is a plurality of data slot identifiers linked to a portion of said plurality of data slot packets.

65. A method of receiving additional data in a data communication system; comprising the steps of:

receiving a data slot packet;

extracting data and a bit pattern from said data slot packet;

sequentially selecting from a plurality of algorithms and calculating a verifying bit pattern for each presently selected algorithm, and upon finding equality between said verifying bit pattern and said extracted bit pattern, linking additional data corresponding to the presently selected algorithm to said extracted data.

66. The method of claim 65, and wherein said data slot packet has a predetermined length.

67. The method of claim 65, and wherein said additional data is a data slot packet identifier.

68. The method of claim 65, and wherein said bit pattern is an error correction bit pattern.

69. The method of claim 65, and wherein said plurality of algorithms implement a plurality of error detection polynomials.

70. The method of claim 65, and wherein said plurality of algorithms are implemented as a plurality of look-up tables.

71. The method of claim 65, and wherein said extracting step includes the step of de-interleaving said data packet from said bit pattern.

72. The method of claim 65, and wherein said calculating step further comprises the step of calculating a plurality of verifying bit patterns in accordance with a plurality of extracted data and upon finding equality between more than one said plurality of verifying bit patterns and a plurality of extracted bit patterns, linking additional data corresponding to the presently selected algorithm to said extracted data.

73. The method of claim 65, and wherein said bit pattern in an error detecting bit pattern.

74. The method of claim 73, and wherein said error bit pattern is a CRC error bit pattern.

75. The method of claim 65, and wherein said receiving step further includes receiving a plurality of data slot packets in a continuous stream.

76. The method of claim 75, and wherein said plurality of additional data is a plurality of data slot identifiers linked to a portion of said plurality of data slot packets.

77. The method of claim 76, further comprising the step of aligning said continuous stream of data slot packets according to said linked one of said plurality of data slot packet identifiers.

78. A data communication system for communicating additional data; comprising:

means for selecting one of a plurality of algorithms corresponding to additional data;

means for calculating a bit pattern in accordance with a data packet and said selected algorithm;

means for inserting said data packet and said bit pattern into a data slot packet;

means for transmitting said data slot packet;

means for receiving said data slot packet;

means for extracting said data packet and said bit pattern from said data slot packet;

means for sequentially selecting from said plurality of algorithms and calculating a verifying bit pattern for each presently selected algorithm, and means for linking said additional data corresponding to the presently selected algorithm to said extracted data packet upon finding equality between said verifying bit pattern and said extracted bit pattern.

79. A data transmitter for transmitting additional data in a data communication system; comprising:

means for selecting one of a plurality of algorithms corresponding to additional data;

means for calculating a bit pattern in accordance with a data packet and said selected algorithm;

means for inserting said data packet and said bit pattern into a data slot packet, and means for transmitting said data slot packet.

80. A data receiver for receiving additional data in a data communication system; comprising:

means for receiving a data slot packet;

means for extracting a data packet and a bit pattern from said data slot packet;

means for sequentially selecting from a plurality of algorithms and calculating a verifying bit pattern, in accordance with said extracted data packet, for each presently selected algorithm, and means for linking additional data corresponding to the presently selected algorithm to said extracted data upon finding equality between said verifying bit pattern and said extracted bit pattern.

* * * * *